United States Patent
Liang et al.

(10) Patent No.: US 11,481,994 B2
(45) Date of Patent: Oct. 25, 2022

(54) METHOD AND APPARATUS FOR EXTRACTING IMAGE DATA IN PARALLEL FROM MULTIPLE CONVOLUTION WINDOWS, DEVICE, AND COMPUTER-READABLE STORAGE MEDIUM

(71) Applicant: Beijing Baidu Netcom Science and Technology Co., Ltd., Beijing (CN)

(72) Inventors: Zihao Liang, Beijing (CN); Jian Ouyang, Beijing (CN)

(73) Assignees: Beijing Baidu Netcom Science and Technology Co., Ltd., Beijing (CN); Kunlunxin Technology (Beijing) Company Limited, Beijing (CN)

(*) Notice: Subject to any disclaimer, the term of this patent is extended or adjusted under 35 U.S.C. 154(b) by 219 days.

(21) Appl. No.: 16/807,775

(22) Filed: Mar. 3, 2020

(65) Prior Publication Data
US 2021/0034900 A1 Feb. 4, 2021

(30) Foreign Application Priority Data
Jul. 30, 2019 (CN) .......................... 201910694475.8

(51) Int. Cl.
*G06V 10/94* (2022.01)
*G06K 9/62* (2022.01)
(Continued)

(52) U.S. Cl.
CPC ......... *G06V 10/955* (2022.01); *G06K 9/6257* (2013.01); *G06N 3/04* (2013.01); *G06V 10/22* (2022.01); *G06N 3/08* (2013.01)

(58) Field of Classification Search
CPC ............. G06K 9/00986; G06K 9/2054; G06K 9/6257; G06N 3/04; G06N 3/08;
(Continued)

(56) References Cited

U.S. PATENT DOCUMENTS

2019/0220731 A1* 7/2019 Woolley, Jr. ....... G06K 9/00979
2020/0057938 A1 2/2020 Lu
(Continued)

FOREIGN PATENT DOCUMENTS

| EP | 3480740 A1 | 5/2019 |
|---|---|---|
| WO | WO 2018/196863 A1 | 11/2018 |
| WO | WO 2019/109795 A1 | 6/2019 |

OTHER PUBLICATIONS

IJzerman, J.; "AivoTTA: An Energy Efficient Programmable Accelerator for CNN-Based Object Recognition" Embedded Computer Systems; ACM, 2 Penn Plaza, Suite 701, New York, NY 10121 USA; Jul. 15, 2018, pp. 28-37 XP058423983; DOI: 10.1145/3229631.3229637; ISBN: 978-1-4503-6494-2 (10 pages).
(Continued)

*Primary Examiner* — Qun Shen
(74) *Attorney, Agent, or Firm* — Nixon Peabody LLP (57) ABSTRACT

Embodiments of the present disclosure provide a method and apparatus for extracting image data in parallel from multiple convolution windows, a device, and a computer-readable storage medium. The method includes: dividing an image into multiple groups of convolution windows, where the multiple groups of convolution windows include a first group of convolution windows and a second group of convolution windows, and each group of convolution windows include multiple convolution windows. The method further includes extracting image data in parallel from multiple convolution windows in the first group of convolution windows by using multiple data processing units, and extracting, after the extraction of image data from the first group of convolution windows is completed, image data from multiple convolution windows in the second group of convolution windows in parallel by using the multiple data processing units.

15 Claims, 6 Drawing Sheets

(51) Int. Cl.
*G06N 3/04* (2006.01)
*G06V 10/22* (2022.01)
*G06N 3/08* (2006.01)

(58) Field of Classification Search
CPC .... G06N 3/0454; G06N 3/063; G06F 17/153; G06F 9/30007
See application file for complete search history.

(56) References Cited

U.S. PATENT DOCUMENTS

| | | | |
|---|---|---|---|
| 2020/0074288 A1* | 3/2020 | Zhang | G06N 3/063 |
| 2020/0118638 A1* | 4/2020 | Leobandung | G06N 3/04 |
| 2020/0193273 A1* | 6/2020 | Chung | G06F 9/54 |
| 2020/0210840 A1* | 7/2020 | Darvish Rouhani | G06F 7/483 |
| 2020/0264876 A1* | 8/2020 | Lo | G06K 9/6262 |
| 2021/0089841 A1* | 3/2021 | Mithun | G06V 10/82 |

OTHER PUBLICATIONS

IJzerman, J.; "Customized low power processor for object recognition: a programmable high performance low power TTA-SIMD accelerator for CNN-based object recognition"; Master's thesis, Dec. 31, 2016; XP055851911; Retrieved from the Internet: URL:https://pure.tue.nl/ws/portalfiles/portal/46944848/855329-1.pdf [retrieved on Oct. 15, 2021](94 pages).

European Patent Office, Office Communication pursuant to Article 94(3) EPC for Application No. 20161994.7, dated Oct. 21, 2021 (8 pages).

* cited by examiner

METHOD AND APPARATUS FOR EXTRACTING IMAGE DATA IN PARALLEL FROM MULTIPLE CONVOLUTION WINDOWS, DEVICE, AND COMPUTER-READABLE STORAGE MEDIUM

CROSS-REFERENCE TO RELATED APPLICATIONS

This application claims priority to Chinese Patent Application No. 201910694475.8, filed on Jul. 30, 2019, titled "Method and apparatus for extracting image data in parallel from multiple convolution windows, device, and computer-readable storage medium," which is hereby incorporated by reference in its entirety.

TECHNICAL FIELD

Embodiments of the present disclosure generally relate to the field of image data processing technology, and more specifically to a method and apparatus for extracting image data in parallel from multiple convolution windows, a device, and a computer-readable storage medium.

BACKGROUND

Machine learning enables a machine to learn laws from a large amount of data like humans, thus generating a machine learning model that can complete some specific tasks. Artificial neural networks are a typical machine learning technology. An artificial neural network is created based on a human brain model, and allows a computer to learn through mass data by using various machine learning algorithms. Common artificial neural networks include convolutional neural networks (CNNs), recurrent neural networks (RNNs), and the like. Deep learning is also a type of machine learning, but the deep learning uses a deep neural network (DNN), so that the processing of a model is more complex, and the model understands data more deeply.

CNN is a feed-forward neural network containing convolutional calculation and having a deep structure, and is widely applied in the field of computer vision, especially image processing. From the perspective of a computer, an image is actually a two-dimensional or three-dimensional matrix. The CNN is used to extract features from a two-dimensional or three-dimensional array by convolution, pooling or the like, and identify the image. The CNN usually consists of an input layer, a convolutional layer, an activation function, a pooling layer, and a fully connected layer.

With the diversification of neural network models and the increase in computing power requirements, the industry has begun to develop deep learning accelerators in view of the factors such as performance and cost of conventional deep learning hardware platforms (such as a general-purpose processor and a graphics processing unit (GPU)). One of the hardware cores of the deep learning accelerator is matrix operation, and the operation of a matrix operation module depends on the upper level of data supply. In order to make full use of the computing power of the matrix operation module, efficient and flexible data supply is the focus of hardware design.

SUMMARY

Embodiments of the present disclosure provide a method and apparatus for extracting image data in parallel from multiple convolution windows, a device, and a computer-readable storage medium.

In a first aspect, an embodiment of the present disclosure provides a method for extracting image data in parallel from multiple convolution windows, including: dividing an image into multiple groups of convolution windows, the multiple groups of convolution windows comprising a first group of convolution windows and a second group of convolution windows; extracting image data in parallel from multiple convolution windows in the first group of convolution windows by using multiple data processing units; and extracting, in response to completing the extraction of image data from the first group of convolution windows, image data in parallel from multiple convolution windows in the second group of convolution windows by using the multiple data processing units.

In a second aspect, an embodiment of the present disclosure provides an apparatus for extracting image data in parallel from multiple convolution windows, including: a convolution window group division module, configured to divide an image into multiple groups of convolution windows, wherein the multiple groups of convolution windows comprise a first group of convolution windows and a second group of convolution windows; a first concurrent extraction module, configured to extract image data in parallel from multiple convolution windows in the first group of convolution windows by using multiple data processing units; and a second concurrent extraction module, configured to extract, in response to completing the extraction of image data from the first group of convolution windows, image data in parallel from multiple convolution windows in the second group of convolution windows by using the multiple data processing units.

In a third aspect, an embodiment of the present disclosure provides an electronic device, including: one or more processors; and a storage apparatus for storing one or more programs, where the one or more programs, when executed by the one or more processors, cause the electronic device to implement the various methods and or processes according to embodiments of the present disclosure.

In a fourth aspect, an embodiment of the present disclosure provides a computer-readable storage medium, storing a computer program thereon, where when the program is executed by a processor, the various methods and or processes according to embodiments of the present disclosure are implemented.

It should be appreciated that the description of the summary is not intended to limit the key features or important features of embodiments of the present disclosure, or to limit the scope of the present disclosure. Other features of the present disclosure will become readily comprehensible through the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference signs in the drawings denote the same or similar elements.

DETAILED DESCRIPTION OF EMBODIMENTS

The embodiments of the present disclosure will be described in more detail below with reference to the accompanying drawings. Although some embodiments of the present disclosure are shown in the drawings, it should be appreciated that the present disclosure may be implemented in various forms and should not be construed as limited to the embodiments described here, and these embodiments are provided in turn for more thorough and complete understanding of the present disclosure. It should be understood that the drawings and embodiments of the present disclosure are merely illustrative, but are not intended to limit the scope of the present disclosure.

In the description of the embodiments of the present disclosure, the term "include" and the like should be interpreted as open inclusion, i.e., "include but not limited to". The term "based on" should be interpreted as "at least partially based on". The term "one embodiment" or "the embodiment" should be interpreted as "at least one embodiment". The term "some embodiments" should be interpreted as "at least some embodiments". Other explicit and implicit definitions may also be included below.

Conventionally, in the process of image convolution processing, a convolution kernel is slid on an image, and pixels of a convolution window are extracted each time and output. However, the conventional method is to extract image data from different convolution windows serially, so data conversion cannot be performed efficiently, which affects the processing performance. In addition, the conventional scheme also performs matrix transposition serially. Therefore, the shortcomings of the related art mainly lie in that the concurrence of hardware cannot be fully exerted while the flexibility is ensured, only one number or a group of numbers is operated each time, and data conversion cannot be performed efficiently, thus limiting the performance of subsequent calculation.

Therefore, the embodiments of the present disclosure propose a solution for extracting image data in parallel from multiple convolution windows. According to the embodiments of the present disclosure, during the extraction of convolution data, multiple data processing units are used to extract image data from multiple convolution windows in parallel, which improves the speed of data extraction, thereby improving the processing efficiency of image convolution. In addition, some embodiments of the present disclosure also propose a solution of concurrent matrix transposition, where multiple columns in a matrix are extracted in parallel by multiple data processing units, which improves the speed of matrix transposition. Some example implementations of the embodiments of the present disclosure will be described in detail below with reference to FIGS. 1-8.

Figure 1:
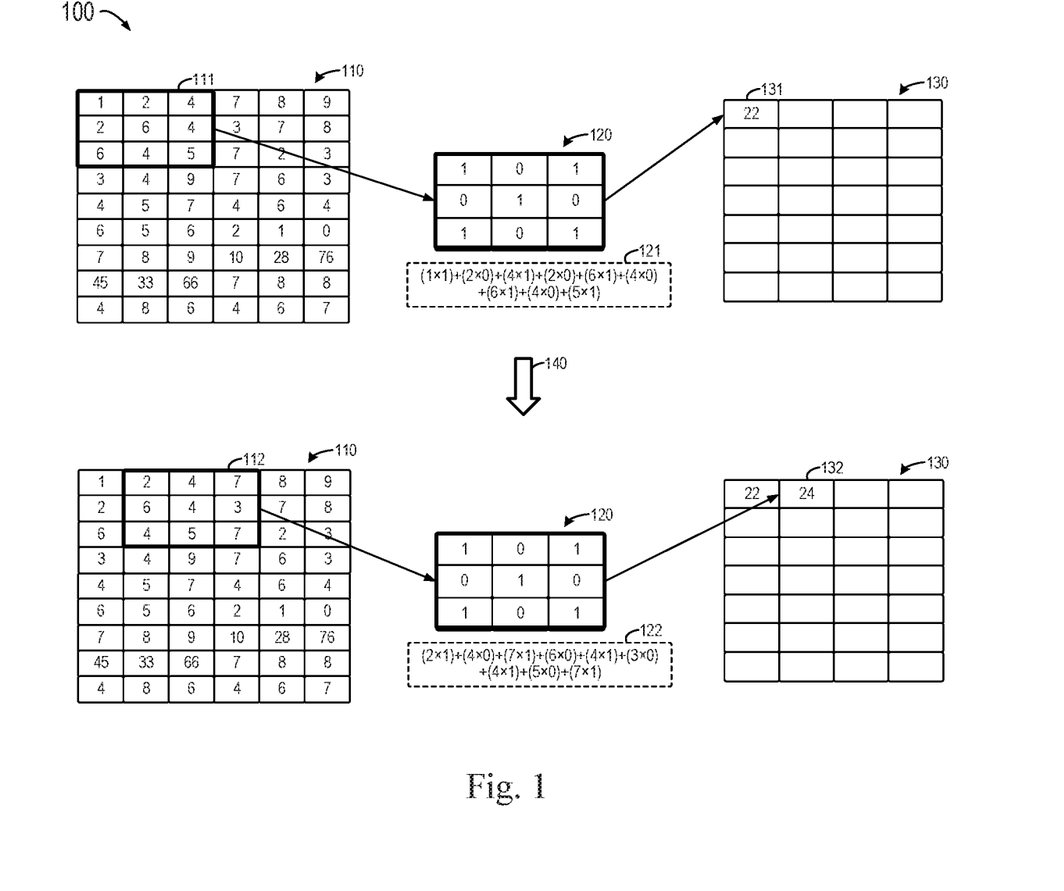
FIG. 1 shows a schematic diagram of a convolution process in a convolutional neural network.

FIG. 1 shows a schematic diagram of a convolution process 100 in a convolutional neural network. The convolutional neural network discovers some features of an image by image convolution, for example, searches edges of an object in the image, enhances or weakens an effect of the image, such as blurring, sharpening or embossing effect of the image.

FIG. 1 illustrates an example process of convolving an image 110 by a convolution kernel 120, where the convolution kernel 120 may be a 3×3 two-dimensional matrix. It should be understood that multiple convolution kernels may be used to convolve the image. The idea of image convolution is to weight the values of single pixels in the input image (for example, the image 110) by the values of surrounding adjacent pixels, and the new pixel values generated by the weighting operation can generate a new output image (for example, an image 130).

The convolution kernel 120 obtains convolution data by sliding each convolution window in the image 110. As shown in FIG. 1, first, the convolution kernel is slid to the first convolution window 111 in the image 110, the products of pixels in the convolution window 111 and the convolution kernel 120 are accumulated (as shown by 121) to generate a convolution output 131, and the convolution output 131 is stored in the image 130. For example, elements are multiplied and then added, and the obtained value is placed at the position of the first element of the output image matrix.

After the convolution of the convolution window 111 is completed, the convolution kernel is slid to the right by 1 distance or more distances. This distance is called a stride, which may be preset. Next, as shown by arrow 140 in FIG. 1, for the second convolution window 112 in the image 110, the products of pixels in the convolution window 112 and the convolution kernel 120 are accumulated (as shown by 122) to generate a convolution output 132, and the convolution output 132 is stored in the image 130. Then, the convolution process is repeated until the convolution kernel 120 is slid throughout all the convolution windows in the image 110, thus generating a convolved image 130. However, the data is serially extracted and sequentially calculated in the convolution process described in FIG. 1, so that the convolution process is slow.

Figure 2:
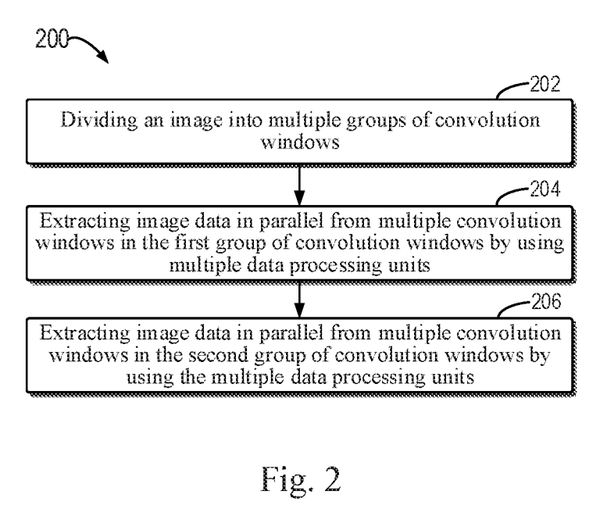
FIG. 2 shows a flowchart of a method for extracting image data concurrently from multiple convolution windows according to an embodiment of the present disclosure.

FIG. 2 shows a flowchart of a method 200 for extracting image data in parallel from multiple convolution windows according to an embodiment of the present disclosure. It should be understood that the method 200 may be performed by a dedicated accelerator device (such as an artificial intelligence (AI) chip), a general-purpose computer, or other dedicated computing devices.

In block 202, an image is divided into multiple groups of convolution windows, where the multiple groups of convolution windows include a first group of convolution windows and a second group of convolution windows. For example, the image may be divided into multiple groups of convolution windows (each group of convolution windows includes P convolution windows) according to the number (e.g., P) of available data processing units, so that each group of convolution windows can be processed in parallel by multiple data processing units.

In block 204, image data is extracted in parallel from multiple convolution windows in the first group of convolution windows by using multiple data processing units. For example, the first group of convolution windows may include P convolution windows, and image data is extracted in parallel from the P convolution windows by using P data processing units in an acceleration device (such as an AI chip), that is, each processing unit extracts image data from a corresponding convolution window. In this way, the extraction speed of the image data in the convolution windows is improved.

In block 206, after the extraction of image data from the first group of convolution windows is completed, image data is extracted in parallel from multiple convolution windows in the second group of convolution windows by using the multiple data processing units. Generally, the number of convolution windows in an image may be much greater than the number of data processing units, so the data needs to be extracted in parallel in sections. For example, after extracting the image data in parallel from the P convolution windows, the P data processing units extract data from next P convolution windows. This step is repeated till the image data in all the convolution windows of the image is extracted.

Therefore, according to the embodiment of the present disclosure, during the extraction of convolution data, multiple data processing units are used to extract image data in parallel from multiple convolution windows, which improves the speed of data extraction, thereby improving the processing efficiency of image convolution.

Figure 3:
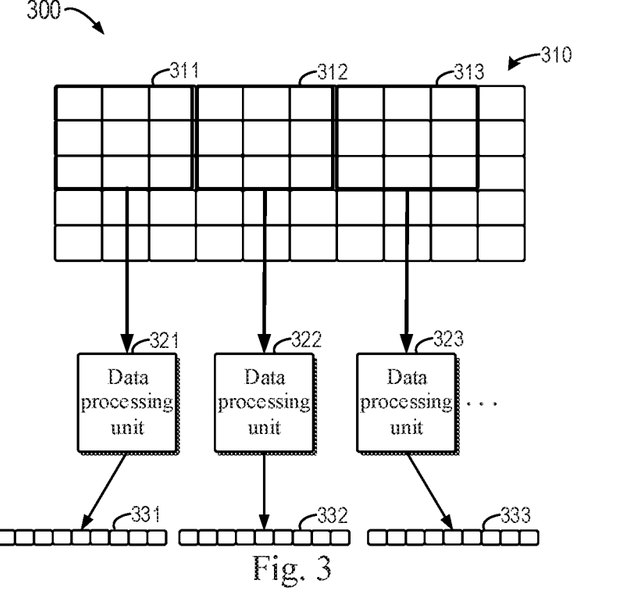
FIG. 3 shows a schematic diagram of a process of extracting image data concurrently from multiple convolution windows according to an embodiment of the present disclosure.

FIG. 3 shows a schematic diagram of a process 300 of extracting image data in parallel from multiple convolution windows according to an embodiment of the present disclosure. As shown in FIG. 3, convolution windows 311, 312, 313 in an image 310 may be processed in parallel by data processing units 321, 322, 323, respectively, and corresponding data 331, 332, 333 (which may be one-dimensional vectors, respectively) in the convolution windows 311, 312, 313 may be extracted concurrently. It should be understood that, for the purpose of clear illustration, the stride of the convolution windows in FIG. 3 is 3, so that the three convolution windows 311, 312, 313 do not repeat. However, the stride may also be set to 1 or other values, so that different convolution windows may have repeated pixels. In addition, for simplicity, the image 310 of only one color channel is shown in FIG. 3. However, the image 310 may alternatively include multiple color channels.

Figure 4:
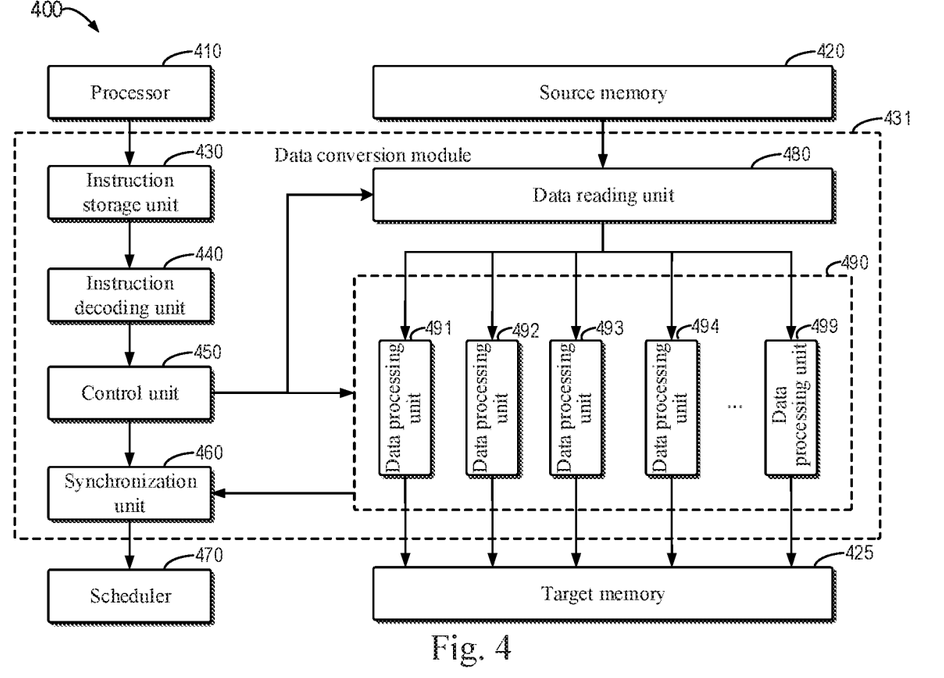
FIG. 4 shows a schematic diagram of an example architecture of an accelerator device for processing data concurrently according to an embodiment of the present disclosure.

FIG. 4 shows a schematic diagram of an example architecture 400 of an accelerator device for processing data concurrently according to an embodiment of the present disclosure. As shown in FIG. 4, the example architecture 400 may include a processor 410, a source memory 420, a target memory 425, a data conversion module 431, a scheduler 470, and the like. The data conversion module 431 may serve as a co-processor, and includes an instruction storage unit 430, an instruction decoding unit 440, a control unit 450, a synchronization unit 460, a data reading unit 480, and multiple data processing units 490, where the multiple data processing units 490 may include, for example, P data processing units 491, 492, 493, 494, and 499.

The source memory 420 and the target memory 425 are respectively an input memory and an output memory, and may be off-chip memories (such as double data rate synchronous dynamic random access memories (DDRs)) or on-chip memories (such as static random access memories (SRAMs)), where the source memory 420 and the target memory 425 may be different memories or the same memory.

The instruction storage unit 430 is used to store an instruction received from the processor 410 for data conversion. The type of the instruction may include, but is not limited to, a parameter configuration instruction, a transposition instruction, a convolution data extraction instruction, a synchronization instruction, or the like. The parameter configuration instruction is used to configure parameters. The parameters include, but are not limited to: data type, scale of a transposed matrix, scale of an convolved image, scale of a convolution kernel, convolution stride, number of edge filling pixels (pads), etc. The transposition instruction is used to configure an initial address of the source memory 420, an initial address of the target memory 425, a length of transposed data, etc. The convolution data extraction instruction is used to configure an initial address of the source memory 420, an initial address of the target memory 425, a length of extracted data, etc. The synchronization instruction is used to ensure that all the instructions before the instruction are executed and the data is stored in disks, so that the scheduler 470 synchronizes respective modules.

The instruction decoding unit 440 is used to read, when it is detected that the instruction storage unit 430 is not empty and has a currently executable instruction, the instruction from the instruction storage unit 430, parse the instruction, and send the parsed content to the control unit 450. The control unit 450 generates a corresponding control signal according to the configured parameters, and the control content includes, but is not limited to, a read request behavior of the data reading unit 480, behaviors of the data processing units 490, and a behavior of the synchronization unit 460.

The data reading unit 480 sends a read request to the source memory 420 according to the control signal of the control unit 450, and transmits the read data to the multiple data processing units 490. The multiple data processing units 490 extract a specific portion of the data from the data reading unit 480 according to the control signal of the control unit 450, and write the data to the target memory 425. According to the embodiment of the present disclosure, the multiple data processing units 490 may extract image data in parallel from multiple convolution windows, and may also transpose multiple columns in a matrix in parallel, thereby improving the speed of data conversion.

The synchronization unit 460 outputs a synchronization completion signal to the external scheduler 470 after receiving a synchronization request and detecting that the current instruction is completed and the data is stored in disks. It should be understood that the example architecture 400 of the accelerator device is only an example architecture including multiple data processing units 490, and other acceleration device having multiple data processing units may also be used with the embodiments of the present disclosure.

Figure 5:
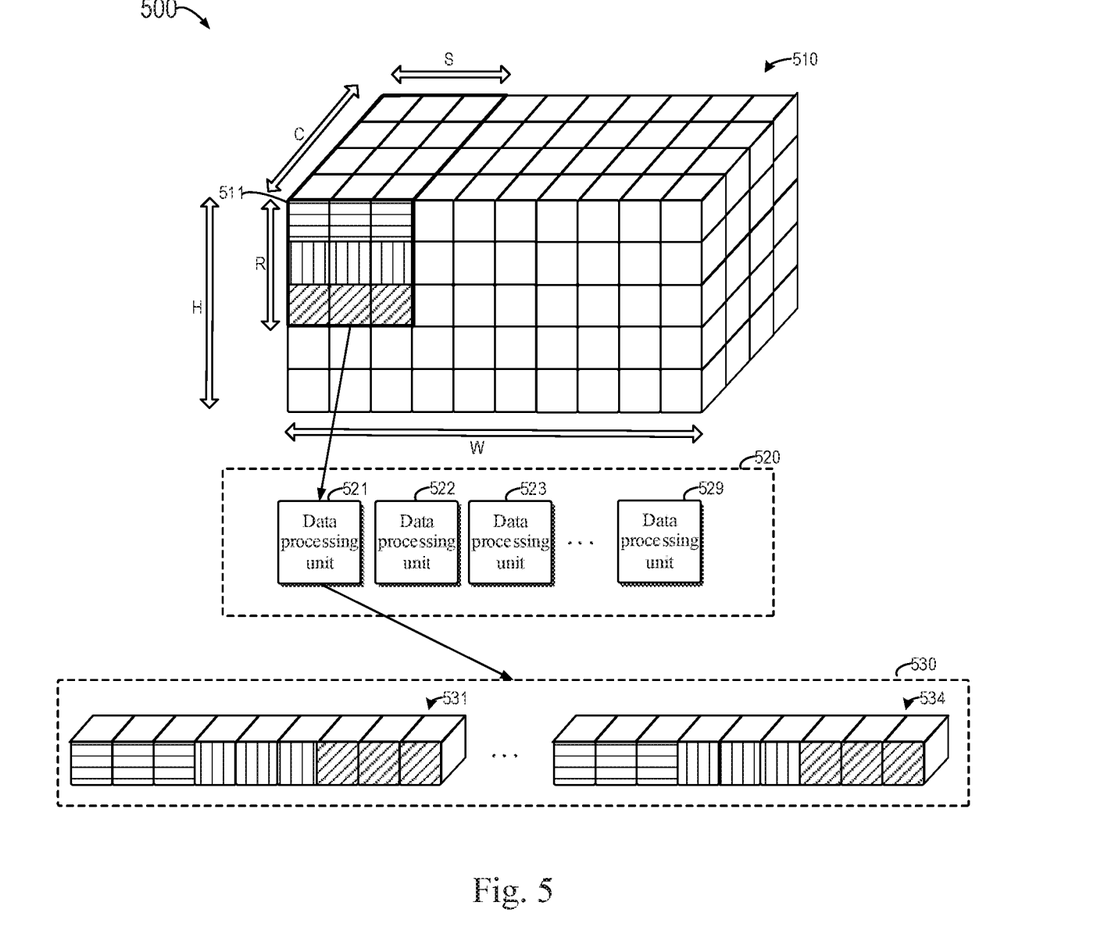
FIG. 5 shows a schematic diagram of an example process of extracting convolution data according to an embodiment of the present disclosure.

FIG. 5 shows a schematic diagram of an example process 500 of extracting convolution data according to an embodiment of the present disclosure. As shown in FIG. 5, the image 510 has a width of W, a height of H, and a channel depth of C, and each convolution window has a width of S and a height of R (the size of the convolution windows is 3×3 in the example of FIG. 5). The accelerator device for image convolution includes multiple data processing units 520, for example, includes P data processing units 521, 522, 523, and 529. According to an embodiment of the present disclosure, the multiple data processing units may extract image data in parallel from multiple convolution windows.

Referring to FIG. 5, the data processing unit 521 is used to extract image data from the convolution window 511. The data processing unit 521 first extracts a first row of data in a first channel (the respective data processing units extract the first row of data in the corresponding convolution windows in parallel), then a second row of data in the first channel, and a third row of data in the first channel. So far, the extraction of data from the first channel in the convolution window 511 in the example of FIG. 5 is completed. Next, the data processing unit 521 extracts all image data from a second channel of the convolution window 511, all image data from a third channel of the convolution window 511, and all image data from a fourth channel of the convolution window 511, thereby completing the data extraction process for the convolution window 511. As shown in FIG. 5, the extracted data 530 includes data 531 of the first channel (including three rows, in a total of 9 values of the first channel), data of the second channel, data of the third channel, and data of the fourth channel 534. According to the embodiment of the present disclosure, since the P data processing units extract data in parallel, the P data processing units can complete the extraction of all image data in parallel from the first P convolution windows.

Next, the multiple data reading units 520 read the data of the subsequent P windows in parallel by the same method as above. Finally, the extraction of data corresponding to all the convolution windows in the image 510 is completed. Since the P data processing units extract the convolution data in parallel, each data processing unit needs to acquire data of the corresponding convolution window according to the stride parameter, and this part of control behavior can be completed by the control unit.

In some embodiments, since the extracted data of one convolution window is continuously stored in the target memory, the image data in a three-dimensional convolution window having a scale of C×R×S may be regarded as a one-dimensional vector having a length of C×R×S on the target memory after being extracted by the data processing unit. Assuming the data of N convolution windows is extracted from the image 510, a two-dimensional matrix having N rows and C×R×S columns is finally stored on the target memory. The convolution kernel may also be regarded as a two-dimensional matrix having F rows and C×R×S columns. If the convolution kernel is transposed into a two-dimensional matrix having C×R×S rows and F columns, the complex image convolution operation is transformed into a multiplication of two two-dimensional matrixes. As shown in the following formula (1), D represents an image data matrix, and W represents a weight data matrix. The image data contained in a convolution window is, for example, the left dotted box (i.e., a one-dimensional vector having a length of C×R×S), and the weight data contained in a convolution kernel is, for example, the right dotted box. In this way, the matrix operation efficiency in the convolution operation can be further improved.

$$\begin{pmatrix} D_{0,0} & D_{0,1} & \ldots & D_{0,C \cdot R \cdot S \text{-}1} \\ D_{1,0} & D_{1,1} & \ldots & D_{1,C \cdot R \cdot S \text{-}1} \\ \ldots & \ldots & \ldots & \ldots \\ D_{N\text{-}10} & D_{N\text{-}11} & \ldots & D_{N\text{-}1,C \cdot R \cdot S \text{-}1} \end{pmatrix}.$$ (1)

-continued
$$\begin{pmatrix} W_{0,0} & W_{0,1} & \ldots & W_{0,F\text{-}1} \\ W_{1,0} & W_{1,1} & \ldots & W_{1,F\text{-}1} \\ \ldots & \ldots & \ldots & \ldots \\ W_{C \cdot R \cdot S\text{-}1,0} & W_{C \cdot R \cdot S\text{-}1,1} & \ldots & W_{C \cdot R \cdot S\text{-}1,F\text{-}1} \end{pmatrix}.$$

Figure 6:
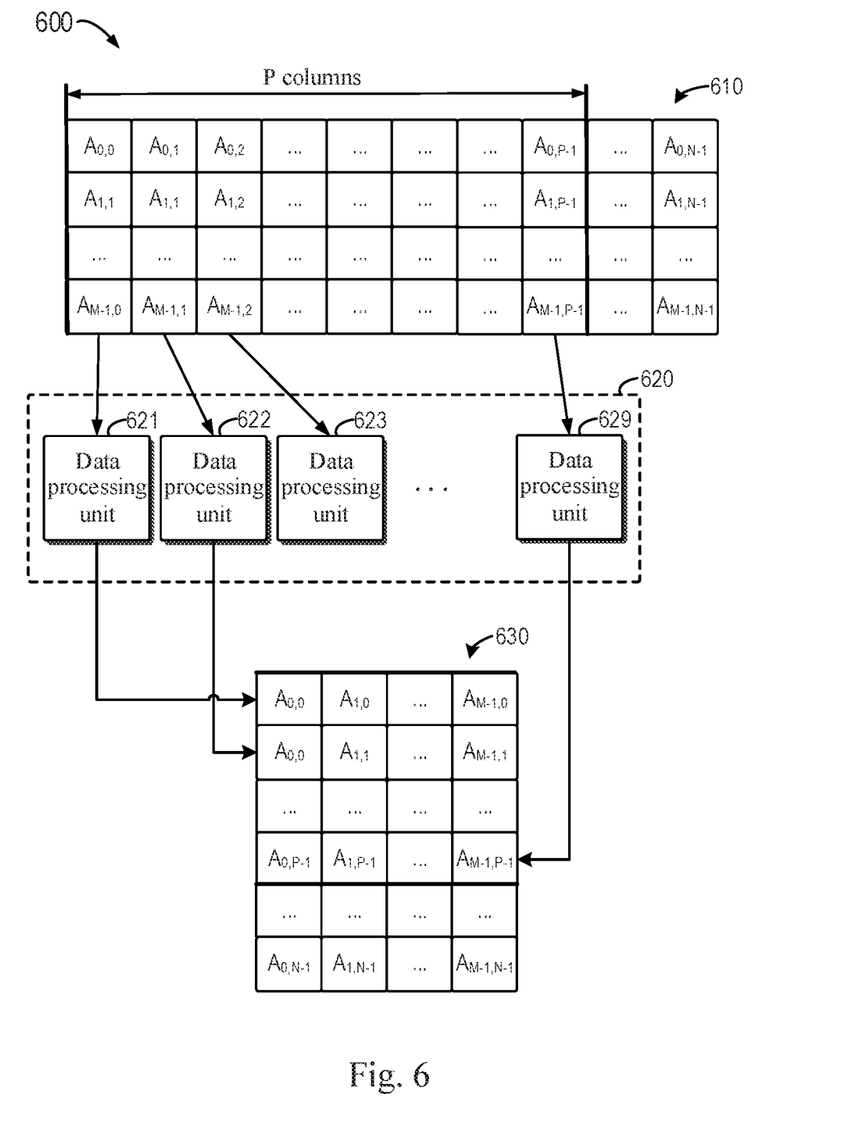
FIG. 6 shows a schematic diagram of an example process for concurrent matrix transposition according to an embodiment of the present disclosure.

FIG. 6 shows a schematic diagram of an example process 600 for concurrent matrix transposition according to an embodiment of the present disclosure. As shown in FIG. 6, it is assumed that an M×N matrix 610 needs to be transposed. Referring to the data conversion module including P concurrent data processing units as described in FIG. 4, the matrix 610 is divided into blocks by P columns as a granularity, that is, the first block includes first P columns, the second block includes second P columns, and so on.

As shown in FIG. 6, multiple data processing units 620 include P data processing units, such as data processing units 621, 622, 623, 629, and the like. Each time the data reading unit reads a row of data of the matrix, each data processing unit process a corresponding column in the row of data in parallel, for example, the data processing unit 621 processes data in the first column (column 0), the data processing unit 622 processes data in the second column (column 1), the data processing unit 623 processes data in the third column (column 2), and the data processing unit 629 processes data in the P column (column P-1).

After processing the P columns of the first block in parallel, the multiple data processing units 620 continue to process P columns of data in next block until the entire matrix 621 is transposed to generate a transposed matrix 630. As shown in FIG. 6, the data processing unit 621 transposes the first column in the matrix 610 into the first row in the matrix 630, the data processing unit 622 transposes the second column in the matrix 610 into the second row in the matrix 630, and the data processing unit 629 transposes the P-th column in the matrix 610 into the P-th row in the matrix 630. In some embodiments, the control unit needs to maintain the write addresses of respective target memories of the P data processing units according to the parameters of instruction configuration and the initial addresses of the target memories.

Therefore, according to the embodiment of the present disclosure, during the extraction of convolution data, multiple data processing units are used to extract image data in parallel from multiple convolution windows, which can improve the speed of data extraction, thereby improving the processing efficiency of image convolution. In addition, the multiple data processing units extract columns in a matrix in parallel in some embodiments of the present disclosure, which can improve the speed of matrix transposition.

Figure 7:
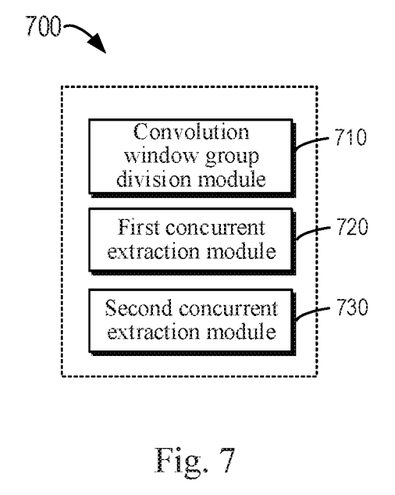
FIG. 7 shows a block diagram of an apparatus for extracting image data concurrently from multiple convolution windows according to an embodiment of the present disclosure.

FIG. 7 shows a block diagram of an apparatus 700 for extracting image data in parallel from multiple convolution windows according to an embodiment of the present disclosure. As shown in FIG. 7, the apparatus 700 includes a convolution window group division module 710, a first concurrent extraction module 720, and a second concurrent extraction module 730. The convolution window group division module 710 is configured to divide an image into multiple groups of convolution windows, where the multiple groups of convolution windows include a first group of convolution windows and a second group of convolution windows. The first concurrent extraction module 720 is configured to extract image data in parallel from multiple convolution windows in the first group of convolution windows by using multiple data processing units. The second concurrent extraction module 730 is configured to extract, in response to completing the extraction of image data from the first group of convolution windows, image data in parallel from multiple convolution windows in the second group of convolution windows by using the multiple data processing units.

In some embodiments, the first group of convolution windows includes a first convolution window and a second convolution window, and the first concurrent extraction module 720 includes: a first data extraction module, configured to extract image data from the first convolution window by using a first data processing unit; and a second data extraction module, configured to extract image data from the second convolution window by using a second data processing unit.

In some embodiments, the first data extraction module includes: a first extraction module, configured to extract a first row of image data from a first channel in the first convolution window; a second extraction module, configured to extract a second row of image data from the first channel in the first convolution window; and a third extraction module, configured to extract a third row of image data from the first channel in the first convolution window.

In some embodiments, the first data extraction module further includes: a second channel extraction module configured to, in response to completing the extraction of all image data from the first channel in the first convolution window: extract a first row of image data from a second channel in the first convolution window; extract a second row of image data from the second channel in the first convolution window; and extract a third row of image data from the second channel in the first convolution window.

In some embodiments, the first data extraction module further includes: a data representation module, configured to represent, in response to completing the extraction of all image data from all channels in the first convolution window, all the image data in the first convolution window by using a one-dimensional vector, where the length of the one-dimensional vector is the product of the number of channels in the image, the number of rows in each convolution window, and the number of columns in each convolution window.

In some embodiments, the apparatus 700 further includes: a data storage module, configured to store all image data in the multiple groups of convolution windows into a target memory by using a two-dimensional matrix, where the number of rows in the two-dimensional matrix is the number of all convolution windows in the multiple groups of convolution windows, and the number of columns in the two-dimensional matrix is the product of the number of channels in the image, the number of rows in each convolution window, and the number of columns in each convolution window.

In some embodiments, the apparatus 700 further includes: a block division module, configured to divide a matrix into multiple blocks in columns, the multiple blocks including a first block and a second block; a first concurrent transposition module, configured to transpose multiple columns of data in the first block in parallel by using the multiple data processing units; and a second concurrent transposition module, configured to transpose, in response to completing the transposition of multiple columns of data in the first block, multiple columns of data in the second block in parallel by using the multiple data processing units.

In some embodiments, the first concurrent transposition module includes: a first matrix transposition module, configured to transpose a first column of data in the first block by using the first data processing unit in the multiple data processing units; and a second matrix transposition module, configured to transpose a second column of data in the second block by using the second data processing unit in the multiple data processing units.

In some embodiments, the block division module includes: a second block division module, configured to divide the matrix into the multiple blocks based on the number of the multiple data processing units.

It should be understood that the convolution window group division module 710, the first concurrent extraction module 720, and the second concurrent extraction module 730 shown in FIG. 7 may be included in a single or multiple electronic devices. Moreover, it should be understood that the modules illustrated in FIG. 7 may perform the steps and/or operations in the methods and/or processes according to the embodiments of the present disclosure.

Therefore, the embodiments of the present disclosure propose a programmable data conversion method and apparatus suitable for a deep learning accelerator, which can flexibly support matrix transposition of various scales and convolution window extraction of images, and can efficiently provide data by fully using the characteristic of concurrence of hardware so as to exert the performance of a matrix operation module. The embodiments of the present disclosure ensure the flexibility of data conversion through programmability, and efficiently convert data by means of concurrent operation of multiple processing units. In addition, the embodiments of the present disclosure can reuse the same set of hardware structure for transposition and convolution, thereby reducing the hardware overhead of final implementation.

Therefore, the benefits of some embodiments of the present disclosure may include, but are not limited to: multiple data processing units operate in parallel to efficiently complete data conversion; a processor transmits a parameter configuration instruction to flexibly configure parameters, which can adapt to multiple scales of data conversion; the complex convolution operation can be transformed into a simple matrix multiplication by the data conversion method of convolution data extraction; and the transposition and extraction of convolution data can be completed by the same set of hardware structure, which saves hardware resources.

Figure 8:
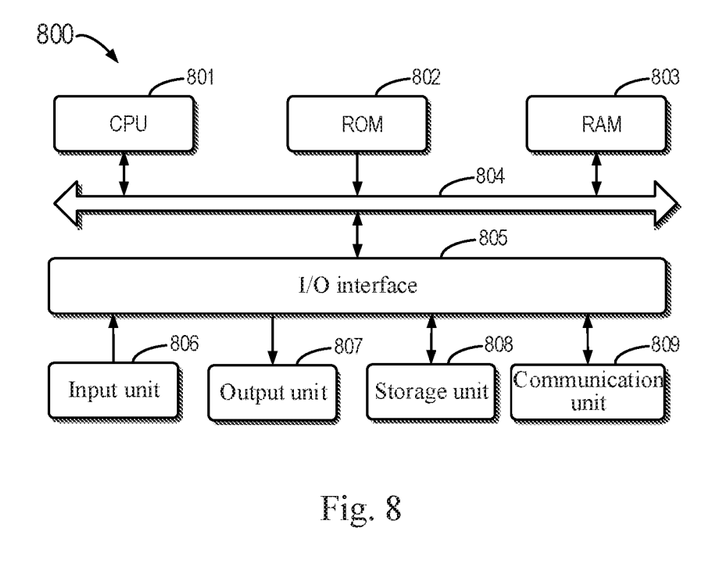
FIG. 8 shows a block diagram of an electronic device capable of implementing multiple embodiments of the present disclosure.

FIG. 8 shows a schematic block diagram of an exemplary device 800 that can be used to implement the embodiments of the present disclosure. It should be understood that the device 800 may be used to implement the apparatus 700 for extracting image data in parallel from multiple convolution windows according to the embodiments of the present disclosure. As shown in the figure, the device 800 includes a central processing unit (CPU) 801, which may execute various appropriate operations and processing based on computer program instructions stored in a read-only memory (ROM) 802 or computer program instructions loaded from a storage unit 808 to a random access memory (RAM) 803. The RAM 803 may also store various programs and data required by the operations of the device 800. The CPU 801, the ROM 802, and the RAM 803 are connected to each other through a bus 804. As shown in FIG. 8, an input/output (I/O) interface 805 is also connected to the bus 804.

A plurality of components in the device 800 are coupled to the I/O interface 805, including: an input unit 806, such as a keyboard or a mouse; an output unit 807, such as various types of displays, or speakers; the storage unit 808, such as a disk or an optical disk; and a communication unit 809 such as a network card, a modem, or a wireless communication transceiver. The communication unit 809 allows the device 800 to exchange information/data with other devices over a computer network such as the Internet and/or various telecommunication networks.

The processing unit 801 performs the various methods and processes described above, such as the method 200. For example, in some embodiments, the method may be implemented as a computer software program that is tangibly embodied in a machine readable medium, such as the storage unit 808. In some embodiments, some or all of the computer programs may be loaded and/or installed onto the device 800 via the ROM 802 and/or the communication unit 809. When a computer program is loaded into the RAM 803 and executed by the CPU 801, one or more of the actions or steps of the method described above may be performed. Alternatively, in other embodiments, the CPU 801 may be configured to perform the method by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions or steps are described in a specific order, this should not be understood that such actions or steps are required to be performed in the specific order shown or in sequential order, or all illustrated actions or steps should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable subcombination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for extracting image data in parallel from multiple convolution windows, comprising:
dividing an image into multiple groups of convolution windows, the multiple groups of convolution windows comprising a first group of convolution windows and a second group of convolution windows, wherein the convolution windows of the first group comprise a first three-dimension convolution window including R rows of pixels, S columns of pixels, and C channels of pixels, each of R, S and C being an integer greater than 1;
extracting image data in parallel from multiple convolution windows in the first group of convolution windows by using multiple data processing units, wherein extracting the image data in parallel from multiple convolution windows in the first group of convolution windows by using multiple data processing units comprises: extracting first three-dimension image data by using the first three-dimension convolution window, wherein the first three-dimension image data comprises R rows of pixels, S columns of pixels, and C channels of pixels, and converting the first three-dimension image data into a first one-dimension image data, wherein the first one-dimension image data comprises (R×S×C) pixels arranged in a row, wherein extracting the image data in parallel from multiple convolution windows in the first group of convolution windows by using multiple data processing units comprises: extracting second three-dimension image data by using the first three-dimension convolution window, wherein the second three-dimension image data comprises R rows of pixels, S columns of pixels, and C channels of pixels; converting the second three-dimension image data into a second one-dimension image data comprising (R×S×C) pixels arranged in a row; and forming a first two-dimension matrix of (R×S×C) columns, wherein the first two-dimension matrix comprises the first one-dimension image data and the second one-dimension image data, and the first one-dimension image data and the second one-dimension image data are arranged in different rows of the two-dimension matrix;
extracting, in response to completing the extraction of image data from the first group of convolution windows, image data in parallel from multiple convolution windows in the second group of convolution windows by using the multiple data processing units;
obtaining a second two-dimensional matrix of a convolution kernel of the first convolution window from a memory storing data of the convolution kernel, the second two-dimensional matrix having (R×S×C) columns;

obtaining a third two-dimensional matrix by transposing the second two-dimensional matrix, the third two-dimensional matrix having (R×S×C) rows; and multiplying the first two-dimensional matrix by the third two-dimensional matrix.

2. The method according to claim 1, wherein the multiple data processing units comprise a first data processing unit and a second data processing unit, the first group of convolution windows comprises a second convolution window, and the extracting image data in parallel from multiple convolution windows in the first group of convolution windows by using multiple data processing units comprises:

extracting image data from the first three-dimension convolution window by using the first data processing unit; and extracting image data from the second convolution window by using the second data processing unit.

3. The method according to claim 2, wherein the extracting image data from the first convolution window by using the first data processing unit comprises:

extracting a first row of image data from a first channel in the first three-dimension convolution window;

extracting a second row of image data from the first channel in the first three-dimension convolution window; and extracting a third row of image data from the first channel in the first three-dimension convolution window.

4. The method according to claim 3, wherein the extracting image data from the first three-dimension convolution window by using the first data processing unit further comprises:

in response to completing the extraction of all image data from the first channel in the first convolution window:

extracting a first row of image data from a second channel in the first three-dimension convolution window;

extracting a second row of image data from the second channel in the first three-dimension convolution window; and extracting a third row of image data from the second channel in the first three-dimension convolution window.

5. The method according to claim 1, further comprising:

dividing a matrix into multiple blocks in columns, the multiple blocks comprising a first block and a second block;

transposing multiple columns of data in the first block in parallel by using the multiple data processing units; and transposing, in response to completing the transposition of multiple columns of data in the first block, multiple columns of data in the second block in parallel by using the multiple data processing units.

6. The method according to claim 5, wherein the transposing multiple columns of data in the first block in parallel by using the multiple data processing units comprises:

transposing a first column of data in the first block by using the first data processing unit in the multiple data processing units; and transposing a second column of data in the second block by using the second data processing unit in the multiple data processing units.

7. The method according to claim 5, wherein the dividing a matrix into multiple blocks in columns comprises:

dividing the matrix into the multiple blocks based on a number of the multiple data processing units.

8. An apparatus for extracting image data in parallel from multiple convolution windows, comprising:

at least one processor; and a memory storing instructions, wherein the instructions when executed by the at least one processor, cause the at least one processor to perform operations, the operations comprising:

dividing an image into multiple groups of convolution windows, wherein the multiple groups of convolution windows comprise a first group of convolution windows and a second group of convolution windows, wherein the convolution windows of the first group comprise a first three-dimension convolution window including R rows of pixels, S columns of pixels, and C channels of pixels, each of R, S and C being an integer greater than 1;

extracting image data from multiple convolution windows in the first group of convolution windows in parallel by using multiple data processing units, wherein extracting the image data in parallel from multiple convolution windows in the first group of convolution windows by using multiple data processing units comprises: extracting first three-dimension image data by using the first three-dimension convolution window, wherein the first three-dimension image data comprises R rows of pixels, S columns of pixels, and C channels of pixels, and converting the first three-dimension image data into a first one-dimension image data, wherein the first one-dimension image data comprises (R×S×C) pixels arranged in a row, wherein extracting the image data in parallel from multiple convolution windows in the first group of convolution windows by using multiple data processing units comprises: extracting second three-dimension image data by using the first three-dimension convolution window, wherein the second three-dimension image data comprises R rows of pixels, S columns of pixels, and C channels of pixels; converting the second three-dimension image data into a second one-dimension image data comprising (R×S×C) pixels arranged in a row; and forming a first two-dimension matrix of (R×S×C) columns, wherein the first two-dimension matrix comprises the first one-dimension image data and the second one-dimension image data, and the first one-dimension image data and the second one-dimension image data are arranged in different rows of the two-dimension matrix;

extracting, in response to completing the extraction of image data from the first group of convolution windows, image data from multiple convolution windows in the second group of convolution windows in parallel by using the multiple data processing units;

obtaining a second two-dimensional matrix of a convolution kernel of the first convolution window from a memory storing data of the convolution kernel, the second two-dimensional matrix having (R×S×C) columns;

obtaining a third two-dimensional matrix by transposing the second two-dimensional matrix, the third two-dimensional matrix having (R×S×C) rows; and multiplying the first two-dimensional matrix by the third two-dimensional matrix.

9. The apparatus according to claim 8, wherein the multiple data processing units comprise a first data processing unit and a second data processing unit, the first group of convolution windows comprises a second convolution window, and the extracting image data in parallel from multiple convolution windows in the first group of convolution windows by using multiple data processing units comprises:

extracting image data from the first three-dimension convolution window by using the first data processing unit; and extracting image data from the second convolution window by using the second data processing unit.

10. The apparatus according to claim 9, wherein the extracting image data from the first convolution window by using the first data processing unit comprises:
    extracting a first row of image data from a first channel in the first three-dimension convolution window;
    extracting a second row of image data from the first channel in the three-dimension first convolution window; and
    extracting a third row of image data from the first channel in the first three-dimension convolution window.

11. The apparatus according to claim 10, wherein the extracting image data from the first three-dimension convolution window by using the first data processing unit further comprises:
    in response to completing the extraction of all image data from the first channel in the first convolution window:
    extracting a first row of image data from a second channel in the first three-dimension convolution window;
    extracting a second row of image data from the second channel in the first three-dimension convolution window; and
    extracting a third row of image data from the second channel in the first three-dimension convolution window.

12. The apparatus according to claim 8, wherein the operations further comprise:
    dividing a matrix into multiple blocks in columns, the multiple blocks comprising a first block and a second block;
    transposing multiple columns of data in the first block in parallel by using the multiple data processing units; and
    transposing, in response to completing the transposition of multiple columns of data in the first block, multiple columns of data in the second block in parallel by using the multiple data processing units.

13. The apparatus according to claim 12, wherein the transposing multiple columns of data in the first block in parallel by using the multiple data processing units comprises:
    transposing a first column of data in the first block by using the first data processing unit in the multiple data processing units; and
    transposing a second column of data in the second block by using the second data processing unit in the multiple data processing units.

14. The apparatus according to claim 12, wherein t the dividing a matrix into multiple blocks in columns comprises:
    dividing the matrix into the multiple blocks based on a number of the multiple data processing units.

15. A non-transitory computer-readable storage medium, storing a computer program thereon, wherein when the program is executed by a processor, the method according to a claim 1 is implemented.

* * * * *